Jan. 17, 1956  D. P. WEBER  2,730,734
MACHINE FOR CUTTING A RAND ON SOLES
Filed Aug. 24, 1949  2 Sheets-Sheet 1

INVENTOR.
DONALD P. WEBER
BY
Schmieding, Hittner & Garb
Attorneys

INVENTOR.
DONALD P. WEBER
BY
Schmieding, Hittson and Gerber
Attorneys

United States Patent Office 2,730,734
Patented Jan. 17, 1956

2,730,734

MACHINE FOR CUTTING A RAND ON SOLES

Donald P. Weber, Columbus, Ohio, assignor to The H. C. Godman Company, Columbus, Ohio, a corporation of Ohio Application August 24, 1949, Serial No. 112,054

3 Claims. (Cl. 12—17)

This invention relates to shoe machines, and more particularly to a machine for cutting a rand on the sole of a shoe. In general, the invention includes an adjustable cutting mechanism adapted to cut a rand of predetermined width and depth in a shoe sole. The machine provides for cutting a rand to remove cementing material used in shoe construction from around the edge of the sole, which material would be visible on the finished shoe sole unless removed. The machine also provides for removing any ragged or feather edges from the shoe sole.

One of the objects of the invention is to provide a machine of the type described having a support with a flat surface over which the shoe sole can be manipulated while held in engagement with a rotatable cutting tool. This tool is provided with a cutting surface which can be maintained substantially parallel with and spaced from the sole supporting surface a distance substantially equal to the depth of the cut to be made in the sole.

It is also an object to provide the cutting tool with a guide element in the form of a freely rotating collar which engages the edge of the shoe sole to limit the width of the cut to be made in the sole.

An additional object is to provide the cutting tool with a plate having its outer edge extending slightly beyond the outer edge of the cutting tool to form a guide to limit the depth of the cut made to form the rand.

Another object of the invention is to provide the machine with a member positioned to press on the support to hold the shoe sole on the support adjacent the cutting tool.

Further objects and advantages of the present invention will be apparent from the following description, reference being had to the accompanying drawings wherein a preferred form of embodiment of the invention is clearly shown.

Figure 1:
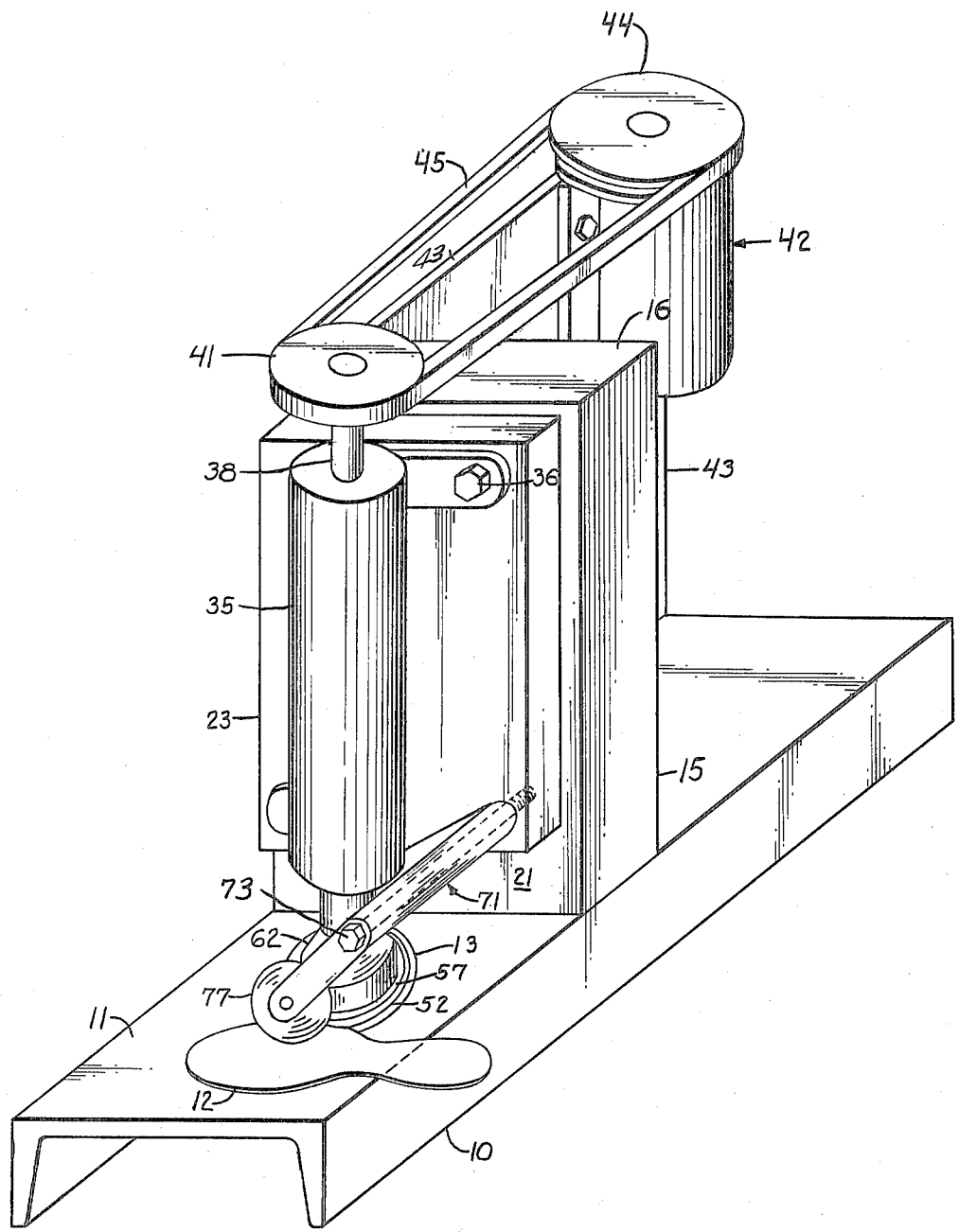
Fig. 1 is a perspective view of a machine embodying the present invention.

Referring further to the drawings, the machine shown in Fig. 1 includes a support 10 which may be formed from channel iron. This support is provided with a flat surface 11 over which the shoe sole 12 can be manipulated. A circular opening 13 is formed in this support so as to extend through the surface 11.

A supporting member 15 is fastened to the support 10 so as to extend at right angles thereto. This member has the top end closed with a plate 16.

A plate 23 is carried by the front wall of member 15. The plate 23 can be moved up or down relative to member 15 and held in desired vertical position by any suitable means.

A mandrel 35 is bolted to plate 23, as shown at 36 and 37. This mandrel is provided with a main driving shaft 38 which carries a tapered stub shaft 39 at its lower end. The upper end of shaft 38 is connected to a V-groove pulley 41. An electrically driven motor 42, Fig. 1, is supported on a plate 43 connected to the top of support 10. The driving pulley 44 of motor 42 is connected to pulley 41 with a V-belt 45 and provides for rotatably driving shaft 38.

Figure 2:
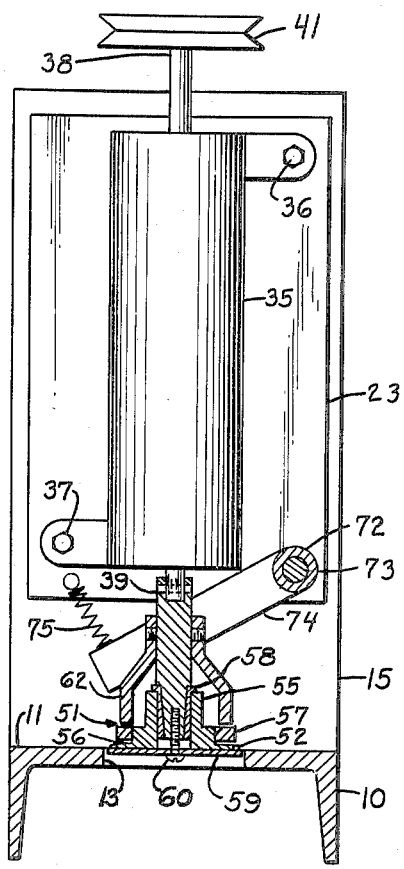
Fig. 2 is a front elevational view of the machine shown in Fig. 1 with the cutting tool, support and presser arm partly in vertical section.
Figure 3:
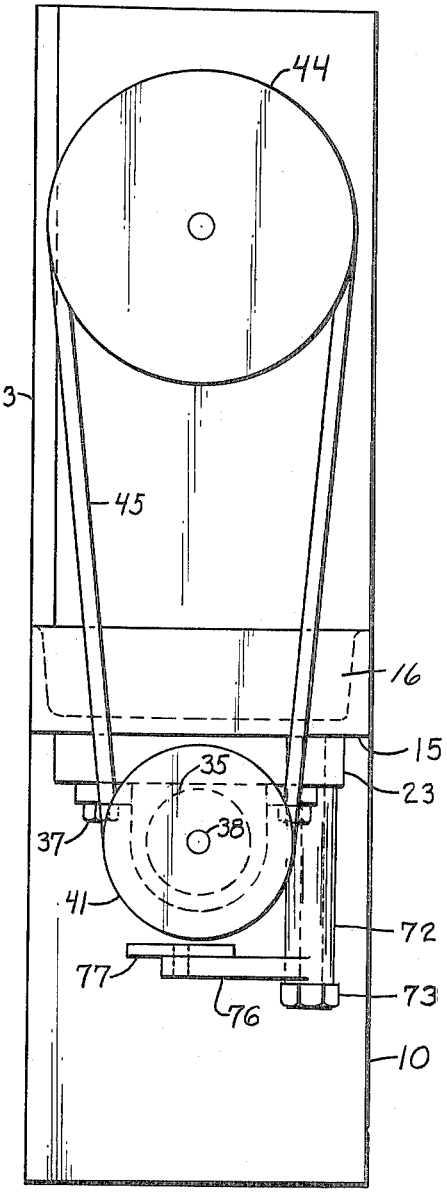
Fig. 3 is a top plan view of the machine shown in Fig. 1.

The cutting tool for forming the rand on the shoe sole is carried on the shaft 39, Fig. 2. This tool, indicated generally at 51, is rotatable on an axis substantially at right angles with the surface 11. The cutting surface of the tool lies on a plane substantially parallel with and spaced from the surface 11 a distance substantially equal to the depth of the cut to be made in the shoe sole. The cutting surface of the tool includes a cutter having a plurality of cutting blades 52 extending radially to the periphery. The cutter is formed with a hub 55 having a shoulder 56 beneath which the cutting blades 52 extend. The blades and shoulder form a seat for the collar 57. This collar is mounted to rotate freely about the hub. As shown in Fig. 2, the diameter of the collar is less than the diameter across the blades 52. When mounted, the outer edge of the collar is spaced inwardly from the outer edge of the cutting blades. The collar thus forms a guide for the edge of the shoe sole which limits the width of the cut made to form the rand.

In mounting the cutter, the hub 55 is received on a collet 58 which seats on the tapered end of shaft 39. A circular plate 59 is attached to the end of shaft 39 with the screw 60 and holds the cutter assembly in position. This plate is of greater diameter than the diameter across the blades 52, as seen in Fig. 2. The edge of plate 59 thus extends to form a guide which can be used to limit the depth of the cut made in forming the rand.

In operation the position of the tool 51 is adjusted relative to the opening 13 by raising or lowering plate 23 and then fastening the plate in adjusted position. The alignment of the cutting blades 52 with respect to the plane of surface 11, then determines the depth of the cut made in the sole when the sole is held flat on the surface 11 and the edge moved into engagement with the blades. The edge of the sole is moved in until it engages the collar 57 which limits the width of the cut made. A shield 62 is connected to the shaft 39 and extends to enclose the hub. If it is desired to have the collar 57 rotate freely and independently of shaft 39, when frictionally engaged by the edge of the sole, the shield is mounted, as shown in Fig. 2, so that its lower edge does not contact the collar. The shield can be lowered so that it contacts the collar 57 and prevents the rotation of the collar independently of shaft 39.

A resiliently mounted member 71 provides for holding the sole pressed flat on surface 11 adjacent the cutting tool. This member includes a hollow shaft 72 mounted on a bolt 73 which extends through the shaft and into plate 23. The shaft is free to rotate on the bolt which serves as a bearing. An arm 74 extends at right angles to the shaft at its inner end. This arm has one end integral with the shaft 72 and has the other end engaging with the compression spring 75. Spring 75 seats against plate 23, as seen in Fig. 2, and forces the end of arm 74 downwardly. An arm 76, carried on the outer end of shaft 72, supports a roller 77. Downward movement of the arm 74 causes the arm 76 to press the roller down and hold the sole in cutting position. The operator can then move the sole around to cut the rand.

While the form of embodiment of the present invention as herein disclosed constitutes a preferred form, it is to be understood that other forms might be adopted, all coming within the scope of the claims which follow.

I claim:

1. A shoe machine for cutting a rand on the bottom face of the sole of a shoe comprising, in combination, a supoprt having a flat horizontal surface and a hole therein, a shaft substantially perpendicular to said surface, means for rotating said shaft, a plate mounted for coaxial rotation with said shaft and disposed in said hole, the upper surface of said plate lying in the same plane as said surface of the support, and a cutting tool mounted on the shaft above the plate, said tool having a lower surface contacting said upper surface of the plate and an upwardly facing cutting surface spaced from said upper surface of the plate a distance substantially equal to the depth of the cut to be made in the sole, and the peripheral edge of said plate being extended radially beyond the peripheral edge of said cutting tool to form a circumferentially extending upwardly facing surface adapted to support the face of a sole at the portion thereof being cut by said cutting tool.

2. A shoe machine for cutting a rand on the bottom face of the sole of a shoe comprising, in combination, a support having a flat horizontal surface and a hole therein, a shaft substantially perpendicular to said surface, means for rotating said shaft, a plate mounted for coaxial rotation with said shaft and disposed in said hole, the upper surface of said plate lying in the same plane as said surface of the support, a cutting tool mounted on the shaft above the plate, said tool having a lower surface contacting said upper surface of the plate and an upwardly facing cutting surface spaced from said upper surface of the plate a distance substantially equal to the depth of the cut to be made in the sole, and the peripheral edge of said plate being extended radially beyond the peripheral edge of said cutting tool to form a circumferentially extending upwardly facing surface adapted to support the face of a sole at the portion thereof being cut by said cutting tool, and a guide element mounted for free rotation on the shaft and above the cutting surface for limiting the width of cut to be made in the sole.

3. A shoe machine for cutting a rand on the bottom face of the sole of a shoe, comprising, in combination, a support having a flat horizontal surface and a hole therein, a shaft substantially perpendicular to said surface, means for rotating said shaft, a plate mounted for coaxial rotation with said shaft and disposed in said hole, the upper surface of said plate lying in the same plane as said surface of the support, a cutting tool mounted on the shaft above the plate, said tool having a lower surface contacting said upper surface of the plate and an upwardly facing cutting surface spaced from said upper surface of the plate a distance substantially equal to the depth of the cut to be made in the sole, and the peripheral edge of said plate being extended radially beyond the peripheral edge of said cutting tool to form a circumferentially extending upwardly facing surface adapted to support the face of a sole at the portion thereof being cut by said cutting tool, and a member positioned to press downwardly on the support radially beyond the perimeter of the cutting tool for holding the sole against said support and said circumferentially extending upwardly facing surface.

References Cited in the file of this patent

UNITED STATES PATENTS

| | | |
|---|---|---|
| 26,113 | Kimball | Nov. 15, 1859 |
| 421,832 | Green | Feb. 18, 1890 |
| 559,508 | White | May 5, 1896 |
| 781,628 | Hadaway | Jan. 31, 1905 |
| 947,079 | Latcham | Jan. 18, 1910 |
| 1,644,442 | Ostman | Oct. 4, 1927 |
| 2,041,531 | De Witt et al. | May 19, 1936 |
| 2,439,486 | Ray | Apr. 13, 1948 |

FOREIGN PATENTS

| | | |
|---|---|---|
| 2,546 | Great Britain | of 1895 |
| 615,650 | France | Oct. 16, 1926 |